Dec. 2, 1969  R. E. PAULSON  3,481,474
CENTRIFUGAL FLUID STRAINER
Filed Aug. 4, 1967

INVENTOR:
Rueben E. Paulson
BY:
ATTORNEYS

2

3,481,474
CENTRIFUGAL FLUID STRAINER
Rueben E. Paulson, Fridley, Minn., assignor to Universal Oil Products Company, Des Plaines, Ill., a corporation of Delaware
Filed Aug. 4, 1967, Ser. No. 658,496
Int. Cl. B01d 29/42
U.S. Cl. 210—304             6 Claims

ABSTRACT OF THE DISCLOSURE

A fluid strainer unit providing for a spiralling centrifugal flow around a vertically positioned cylindrical form screen section and a freely movable ball member in the lower portion of the unit for effecting the crushing and forcing out of oversize particles through a bleed hole. Preferably, the cylindrical screen is formed of wedge-shaped elements providing resulting slotted openings increasing in size toward the interior of the unit and in the direction of flow to provide a non-clogging type unit.

SPECIFICATION

The present invention relates to a self-cleaning form of fluid strainer. More particularly, the improved strainer design provides for spiral flow around a central cylindrical form of screen and, in addition, utilizes at least one freely movable ball member in a lower particle collecting section so as to assist in crushing and forcing oversize particles out from a bleed hole.

Prior art forms of separating devices have, of course, used centrifugal action to assist in particle separation; however, there appears to have been very little utilization of centrifugal flow or spiral flow in combination with vertically oriented and axially positioned strainer sections such that a partial particle separation takes place before the laden fluid reaches the retainer section.

It is also known that movable ball means have been used in a "ball-mill" manner to contact or jar a sifting screen to assist in the movement of particles through said screen. However, again, it seems that a movable ball has not been caused to move by centrifugal flow action and has not been used in combination with a vertically oriented strainer device to crush particles or to assist in the movement of particles out through a bleed hole from a particle collection zone at the lower end of the strainer unit.

SUMMARY OF THE INVENTION

It may be considered a principal object of the present invention to provide a strainer device with a vertically positioned internal cylindrical screen section and an upper tangential fluid inlet whereby there is a descending spiral flow of the laden fluid stream around the screen.

It is also an object of the present invention to provide a special form of inner cylindrical screen with wedge-shaped elements, or a continuously helically positioned wedge-shaped element, such that the resulting slotted openings increase in size in the direction of flow to reduce particle clogging on the screen surface.

A still further object of the improved design of this invention is to provide a moving ball of a crushing or particle pushing means to assist in the continued movement of retained oversize particles out through a bleed hole from the lower particle collection portion of the unit.

Broadly, the present improved strainer device embodies, in combination, a vertically disposed chamber having an upper tangentially positioned fluid stream inlet and a lower tangentially disposed fluid outlet, a vertically positioned cylindrical screen section extending through the center portion of said chamber forming an internal cleaned fluid receiving section and an outer annular section for the spiral flow of incoming particle laden fluid, means connecting the lower open end portion of said screen section with said lower fluid outlet for removing the cleaned fluid from such section, at least one freely movable ball member in said outer annular section suitable for effecting the crushing of oversize particulates collecting in the lower portion of such section, and a bleed outlet from the latter whereby to permit separate removal of the non-passing particulates from said chamber.

A preferred design utilizes a special tubular form of filtering screen or slotted section where wedge-shaped elements, or a continuous helically wound coil, provides resulting slotted openings increasing in size toward the interior of the cylindrical section, i.e., in the direction of flow, so as to provide a self-cleaning or non-clogging type of screening section. The diverging slot means for the fluid flow path through the filter screen section may be obtained by the utilization of tapered elements having approximate triangular or trapezoidal cross-sections. The wider portion or portions of the elements are positioned toward the outside surface and the apex sections are turned inwardly such that any material passing through the cylindrical screen section will first pass through narrow outer slots to reach passageways increasing in size that will readily permit its continued entrained flow. The result is a minimization of the holding of filtered out solid material on the outer surface of the screen and the substantial elimination of the clogging of such screen.

A novel feature of the present invention also resides in the utilization of the one or more ball members within the lower annular portion of the strainer unit such that oversized retained material not passing the screen section will be continuously contacted by the rolling movement of the ball means in a lower particle collection section. The ball movement is caused by the tangential fluid inlet and resulting centrifugal fluid flow and will provide the continuous crushing and forcing of oversized particles through a particle outlet or bleed hole which is provided from the chamber at a low elevation near the bottom end of the screen section where particles will tend to be washed from the centrifugal or spiral flow of the fluid stream. Again, a preferred design utilizes a tapering bleed hole, enlarging from the inside of the housing to the outside, so as to minimize possible clogging of such hole by particles which reach and pass into the bleed opening.

The self-cleaning strainer unit of the present invention may be made of various sizes in order to accommodate varying quantities of particle laden fluid; however, the diameter and the height of the unit shall be correlated so that the tangentially introduced fluid stream spiralling downwardly around the inner cylindrical screen will still have a sufficient velocity to provide continued movement of the one or more ball members in a lower particle collection zone. In other words, it is necessary to insure some substantially continuous movement of the ball means in the particle collection zone such that there will be an effective crushing and movement of oversized particles out of the collecting area through a small bleed stream opening.

The improved design is particularly effective in effecting particle separation in at least a three-fold manner. For example, the centrifugal action of the tangentially introduced laden stream provides an initial separation of larger particles whereby they tend to be thrown out along the outer wall of the unit, away from the screen and down to the lower end portion of the center cylindrical screen. As a part of the centrifugal flow action, there is a decrease in the velocity of the fluid that moves radially toward the interior cylindrical screen such that there is a diminishing ability of the fluid to "carry along" the entrained particles to the screen surface. Secondly, the downwardly spiralling fluid flow will tend to flush away any accumulated material on the surface of the screen element. Actually, in the use of a special screen section having a flat surface with continuous helical slot there is an angular contact of the fluid flow and entrained particles with respect to the filtering surface whereby there is a tendency of particulates to bounce off such surface and carry on downwardly, assisted by gravity, into a lower particle collection zone. As a third advantage, the spiral flow of the fluid stream, carrying down to the lower portion of the filtering or strainer zone, provides, in combination with the movable ball means, a "ball mill" effect which in turn crushes and/or moves along any solid material that might have accumulated over the outlet for withdrawing the solid materials.

Reference to the accompanying drawing and the following description thereof will serve to show means for constructing and operating improved forms of self-cleaning strainer units, as well as assist in setting forth additional advantageous features which may be obtained from the use of the special vertical form of strainer device.

Figure 1:
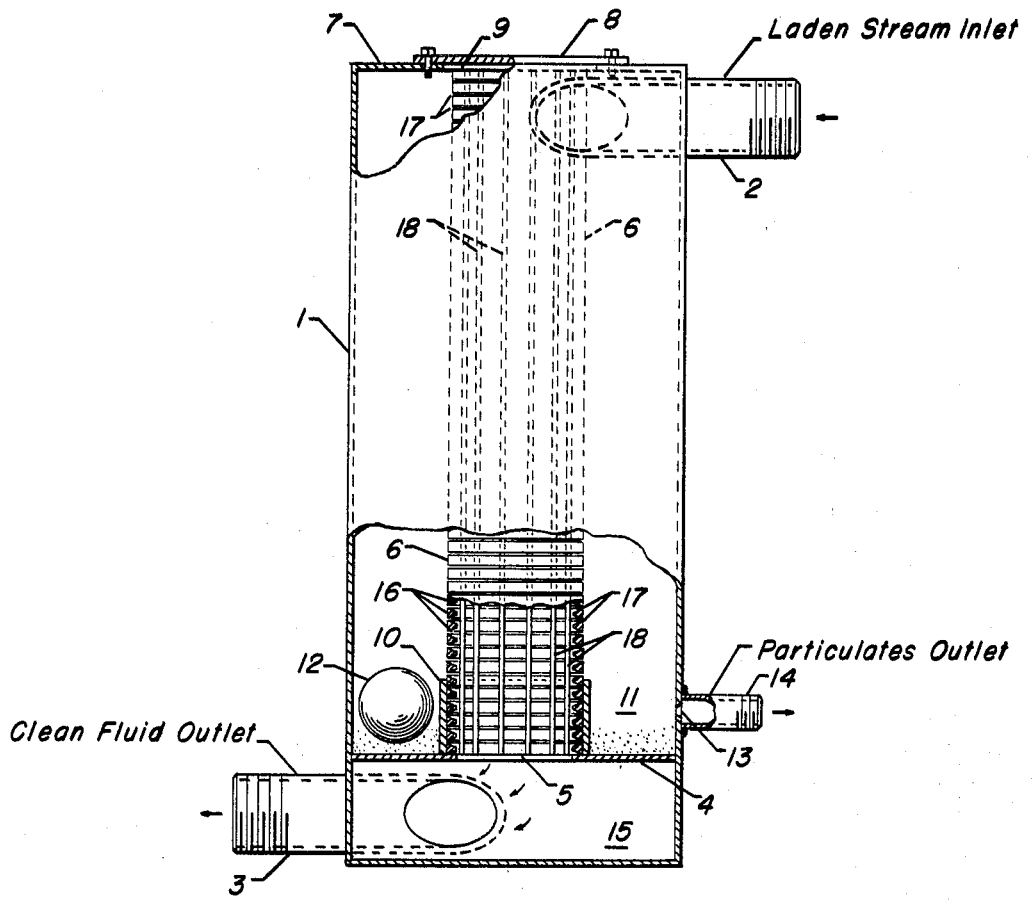
FIGURE 1 of the drawing is an elevational view, partially in section, indicating the construction and operation of one simple form of spiral flow self-cleaning unit.

Referring now particularly to FIGURE 1 of the drawing there is shown a vertically positioned chamber or housing 1 having an upper tangentially positioned fluid inlet port 2 and a lower tangentially positional fluid outlet port 3. Positioned laterally across the lower interior portion of the chamber is a partition plate 4 having a central opening 5 which is placed to be in alignment with the lower open end of an axially positioned cylindrical form screen section 6. The screen 6 extends for the full height of chamber 1 above plate 4 to a top end section 7. The latter is indicated as having a removable cover member 8 over an opening 9 which may be of slightly larger diameter than the cylindrical screen section 6 such that the latter may be removed from inside of chamber 1 if necessary.

The present embodiment also indicates the use of a lower non-perforate collar section 10 around the lower periphery of screen section 6 so that the latter is held in alignment. At the same time, the collar 10 provides an annular trough-like section 11 which is particularly adapted to received settled, separated particulates and accommodate a movable ball member 12. A suitable tapered orifice 13 is provided through the wall of chamber 1 to discharge into a particle outlet means 14 such that there may be the continuous removal of screened particulates from the strainer device.

In the operation of the present improved form of centrifugal flow strainer unit, the laden fluid stream enters the upper inlet port 2 and passes at an initially high velocity spiral flow down around screen section 6 to provide in chamber 1 both a centrifugal and screened separation of particles. The cleaned fluid will pass through the slots or open portion of the surface of the screen section 6 and reach the lower opening 5 and outlet section 15 to be subsequently discharged through the outlet port 3. The latter is preferably a tangentially positioned form of outlet in order to enhance and sustain the spiral flow of the laden stream down through the entire chamber 1. As noted hereinbefore, particulates will be centrifugally thrown to the inside wall of the outer chamber 1 so as to settle by gravity down into the lower collection section 11 while, at the same time, suspended particles reaching the cylindrical screen 6 and being held upon the surface of such screen 6 will in turn gradually be washed downwardly therefrom to also reach the collection section 11. Also, the ball member 12 will continuously be moving and rotating through the latter section in the midst of the separated material so as to effect the crushing of any oversized particulates and enhance their removal from outlet orifice 13. Actually, any oversized particles which may tend to clog outlet 13 will be periodically bumped and crushed by the ball means 12 as it makes its periodic rounds through the lower section 11 from the action of the spiral liquid flow.

Preferably, the one or more ball means 12 shall be of a diameter to substantially fill the width provided between the inside wall of chamber 1 and the outside diameter of the collar section 10, whereby to enhance the desired crushing effect on oversized particles. The ball itself may be of metal such as of stainless steel or brass and probably in most instances of a hollow construction so as not to be too heavy and resist movement by the fluid flow. It is, however, not intended to limit the ball to any one type of material inasmuch as it may be formed of glass, ceramics plastic, Bakelite, or any other suitable relatively hard, non-wearing type of material.

As pointed out hereinbefore, the screen section 6 is preferably formed of triangular or trapezoidally shaped elements such as 16 in order to provide increasing cross-sectional area slots 17 that are of a non-clogging nature. Also, a preferred form of screen utilizes a continuous element 16 helically wound around a series of spaced longitudinal elements such as 18 and is spot-welded or otherwise connected to such elements so that there is a resulting rigid tubular form of screen section 6 capable of withstanding impact of a particle laden stream. It is further desirable to have a section of sufficient structural strength to be self-supporting from the non-perforate plate 4 to the upper end section 7 of chamber 1. Again, it is not intended to limit the present invention to any one type of material for screen section 6 inasmuch as it may be formed of brass, stainless steel and various types of metal or of various of the plastic mediums which may be extruded and assembled into the desired design. The size of the narrowest portion of slot 17, between elements 16, in the screen member 6 may of course be varied to suit a particular type of laden fluid stream or to suit the requirements of the cleaned fluid stream and the size particulates which may be permitted to be entrained therewith and leave outlet port 3.

Figure 2:
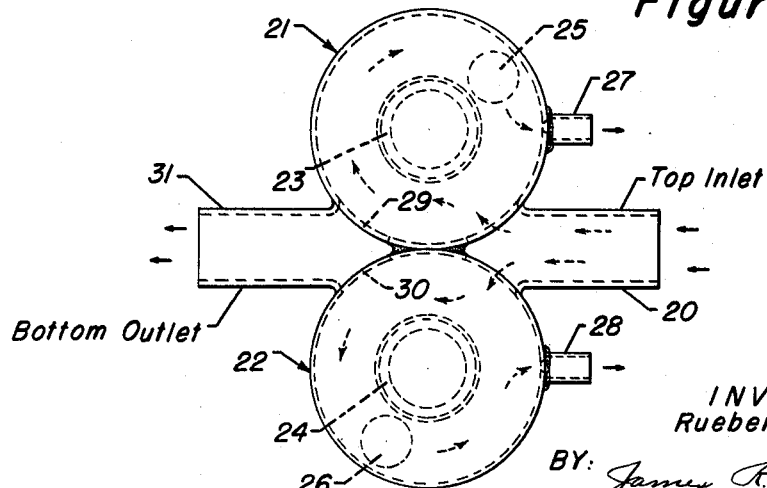
FIGURE 2 of the drawing indicates, in a diagrammatic plan view, a modified form of strainer unit where a single inlet splits into two separate but side by side chambers each of which provides for a descending spiral flow of the laden stream and, in addition, the provision of a single combined fluid outlet means.

Referring now to FIG. 2 of the drawing, there is indicated a modification where a single fluid inlet pipe 20 connects with the upper wall portions of separate chamber means 21 and 22, but provides for a splitting of the stream flow such that one portion of the fluid passes in a clockwise descending spiral flow through chamber 21 and another portion of fluid passes in a counterclockwise descending spiral flow through chamber 22 (with respect to the plan view shown). The operation within each of the chambers 21 and 22 is of course similar to that set forth and described in connection with FIGURE 1. Particulates are screened out of the fluid streams by suitable internal cylindrical screen sections 23 and 24, indicated respectively in chambers 21 and 22, while within the lower end of each annular particle collection zone there is a suitable movable ball means, such as 25 and 26. The latter will assist in moving particulates out from the respective bleed port means 27 and 28 in the same manner as described in connection with orifice 13 for FIGURE 1. By having adjacent cleaned fluid outlet openings, such as 29 and 30, from the lower end portion of each of the adjacent chambers 21 and 22 there may be provision for a common fluid outlet pipe section such as 31, indicated as projecting outwardly in line with the tangential plane of juncture of the two chambers 21 and 22.

It is of course not necessary to have the common inlet or outlet means adjacent chamber sections and still other modifications may be made within the scope of the present invention. For example, while only one crushing ball member has been indicated in each of the embodiments, it is of course possible to utilize two or more ball members in each unit which can be caused to continuously move by fluid stream action along the lower portion of each particle collection section and effect a desired crushing and pushing of particulates out through suitable particulate outlets. Also, where desired, more than one particle outlet means may be provided from the lower particle collection section of each chamber, in order that there may not be any clogging or undesired build-up of particulates in a chamber. A preferred design, however, utilizes an outwardly tapering orifice for particulate withdrawal such that there is a non-clogging type of particle flow. The same design benefit is accomplished with the wedge-shaped elements of the cylindrical screen sections, for once any particle has passed through the initial narrow portion of the screen, it will then carry along freely with the stream flow.

I claim as my invention:

1. A fluid strainer device, which comprises in combination, a vertically disposed chamber having an upper tangentially positioned fluid stream inlet and a lower tangentially disposed fluid outlet, a vertically positioned cylindrical screen section extending through the center portion of said chamber forming an open axially positioned cleaned fluid receiving section and an outer annular section for the descending spiral flow of incoming particle laden fluid, means connecting the lower open end portion of said screen section and the cleaned fluid section with said lower fluid outlet, at least one freely movable ball member rotated in said outer annular section by the circulatory flow of said fluid and suitable for crushing oversize particulates collecting in the lower portion of such section, and a bleed outlet from the latter whereby to permit separate removal of the non-passing particulates from said chamber.

2. The strainer device of claim 1 further characterized in that said cylindrical screen section is formed of wedge element means which has the wider portions thereof adjacent the outer surface and resulting slot means which increase in cross-sectional area toward the interior of the screen, whereby there is a non-clogging form of screen section.

3. The strainer device of claim 2 still further characterized in that said screen section has a continuous closely wound helical coil wedge shape element means providing a continuous narrow slot on the outer face of the cylindrical screen section.

4. The strainer device of claim 1 further characterized in that a non-perforate plate extends laterally across the interior of said vertically disposed chamber above said lower tangentially disposed fluid outlet to provide a cleaned fluid outlet collection zone for the latter, and a non-perforate collar section extends from said non-perforate plate upwardly around a lower end portion of said cylindrical screen section to provide a lower annular non-perforate trough section for the collection of particulates.

5. The strainer device of claim 1 further characterized in that said bleed outlet for particulates from the lower portion of said outer annular section is tapered to provide an enlarged opening toward the outside of said chamber, whereby there is a non-clogging form of passageway for particulates leaving said chamber.

6. A fluid strainer device, having dual particle separation zones, which comprises in combination, a pair of vertically disposed and adjacent cylindrical chambers, a single fluid inlet means connecting to each of said chambers at the zone of their juxtaposition and tangential inlet port openings into each chamber from said single inlet means, a vertically positioned cylindrical screen section extending through the central portion of each of said chambers to form in each an open axially positioned cleaned fluid receiving section and an outer annular section for the descending spiral flow of incoming particle laden fluid and for the collection of separated particulates, a tangential cleaned fluid outlet port from the lower portion of each chamber, said fluid outlet ports being positioned adjacent one another and discharging into a single common fluid outlet means, means connecting the lower open end portion of each axial cleaned fluid receiving section to said tangential outlet port for each chamber, at least one freely movable ball member rotated in each annular section of each chamber, by the circulatory flow of said fluid and suitable for crushing oversize particulates collecting in the lower portion of such section, and a bleed outlet means from the lower portion of each annular section of each chamber, whereby to remove separated particles therefrom.

References Cited

UNITED STATES PATENTS

| | | | |
|---|---|---|---|
| 1,040,342 | 10/1912 | Johnson | 210—497.1 X |
| 2,198,819 | 4/1940 | Holm | 210—304 |
| 2,208,077 | 7/1940 | Linke | 241—84 |
| 2,321,120 | 6/1943 | Howe | 210—497.1 X |
| 2,658,618 | 11/1953 | Vogel | 209—211 |
| 3,061,098 | 10/1962 | Brezinski | 210—304 |

OTHER REFERENCES

Fig. 2, Bulletin (908) Cochrane Hi-Domatic Type Filters, Cochrane Division, Crane Co., 17th St. and Allegheny Ave., Phila. 32, Pa.

REUBEN FRIEDMAN, Primary Examiner

T. A. GRANGER, Assistant Examiner

U.S. Cl. X.R.

210—312, 497.1